United States Patent Office.

DAVID P. MATHEWS, OF WINTHROP, MASSACHUSETTS.

Letters Patent No. 81,920, dated September 8, 1868.

---

IMPROVED MEDICAL COMPOUND FOR CATTLE AND OTHER ANIMALS.

---

*The Schedule referred to in these Letters Patent and making part of the same.*

---

TO ALL PERSONS TO WHOM THESE PRESENTS MAY COME:

Be it known that I, DAVID P. MATHEWS, of Winthrop, in the county of Suffolk, and State of Massachusetts, have invented a new and useful Composition for Improving the Condition or Health of Cattle or other Animals; and do hereby declare the same and the constituents thereof to be described as follows:

In making the said composition, I intimately mix together, in equal quantities, the following ingredients, each being first reduced to a pulverized or comminuted state; that is to say, I mix together elecampane, gentian, paradise-seed, fenugreek-seed, and cummin-seed. These ingredients, so mixed, constitute the composition in question, which, when used, is to be mixed with the food of an animal, horse or ox, for instance, whose condition it may be desirable to improve.

The elecampane gives relief in case of irritation or inflammation of the mucous membranes.

The gentian is an appetizer, as well as a tonic.

The paradise-seed improves the blood, promotes the formation of fat, and renders the coat or hair of the animal smooth and glossy.

The fenugreek-seed operates as a diuretic, and is beneficial in other respects; and the cummin-seed, besides being promotive of the formation of fat, has other useful properties.

It has been found that the above composition, given to a horse or other animal in small doses, from time to time, with his feed, soon results in effecting a manifest improvement in his condition, the liver, and kidneys, and the mucous membranes of the lungs and stomach, as well as the intestines, being acted on to good advantage.

I claim as my invention the said composition, composed of the constituents hereinbefore mentioned.

DAVID P. MATHEWS.

Witnesses:
R. H. EDDY,
F. P. HALE, Jr.